May 16, 1950     H. T. KUCERA     2,508,275
TEMPERATURE CONTROLLING APPARATUS
Filed Feb. 14, 1947     3 Sheets-Sheet 1
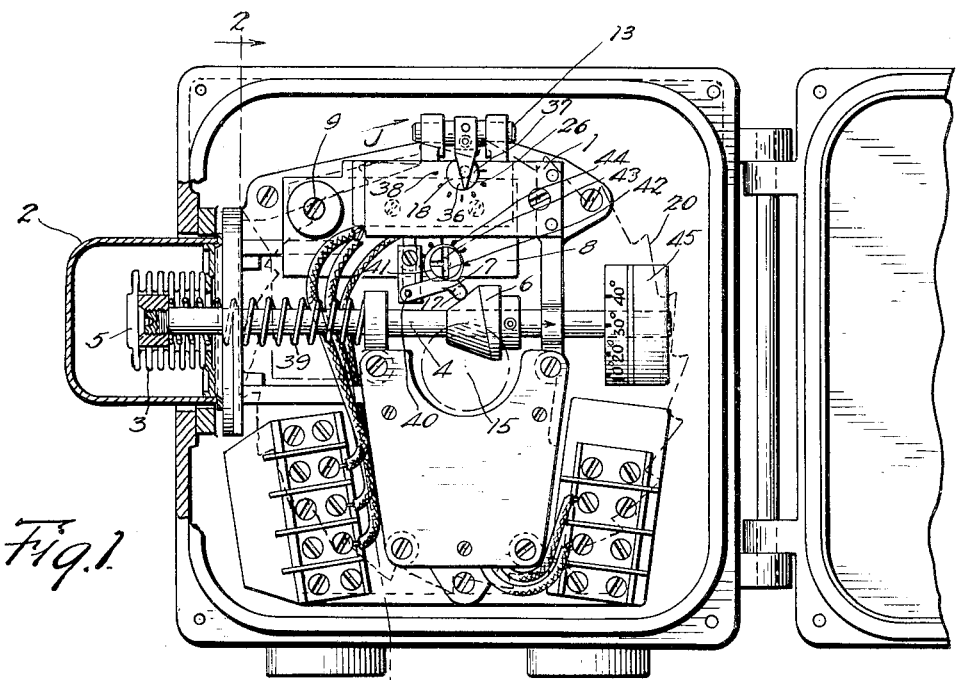
Fig.1
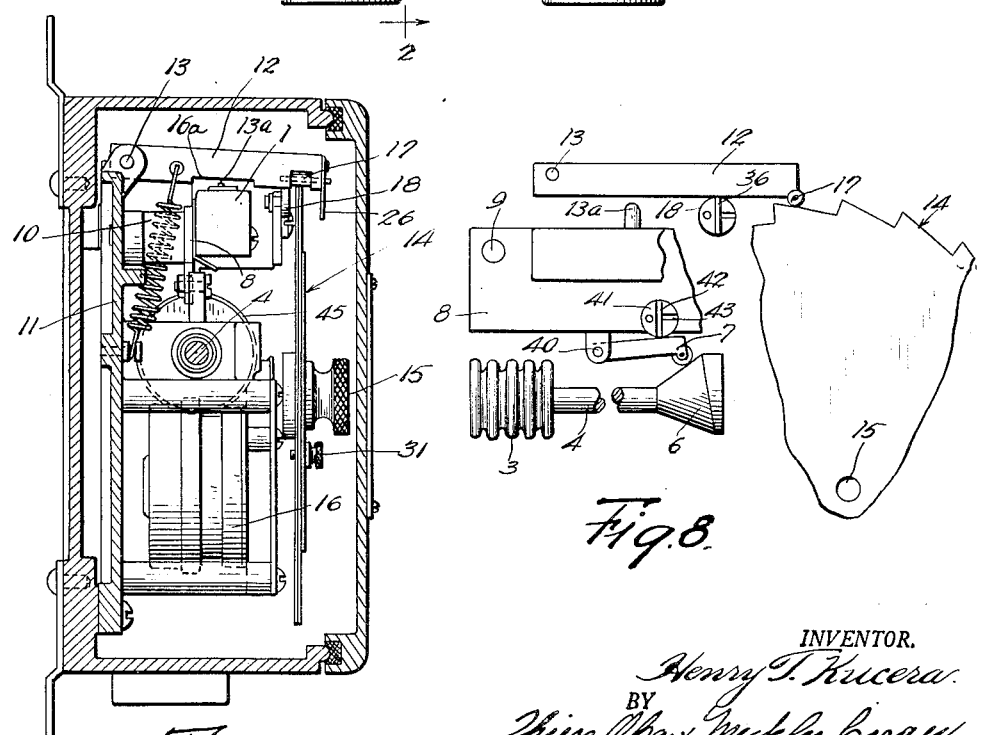
Fig.2
Fig.8
INVENTOR.
Henry T. Kucera
BY May 16, 1950     H. T. KUCERA     2,508,275
TEMPERATURE CONTROLLING APPARATUS
Filed Feb. 14, 1947     3 Sheets-Sheet 2
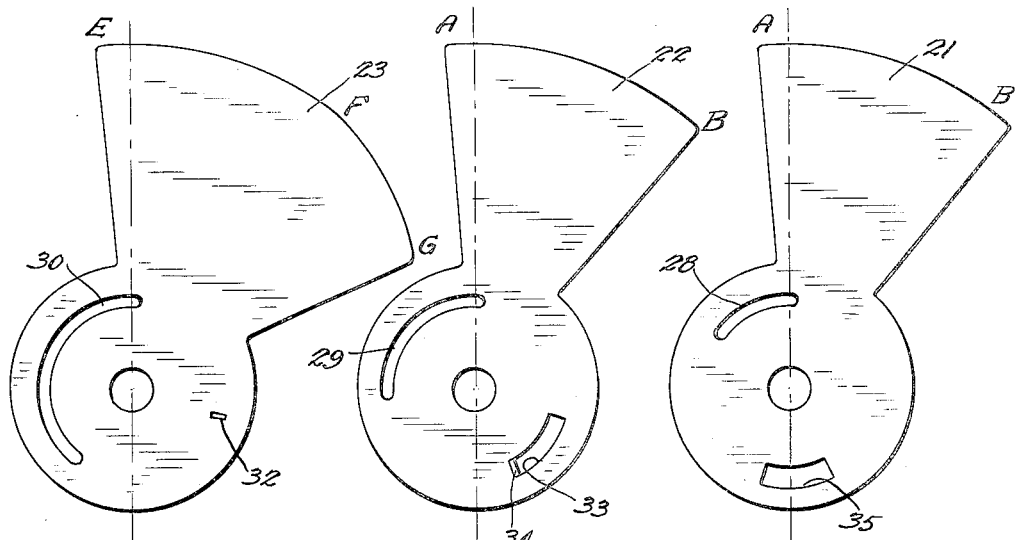
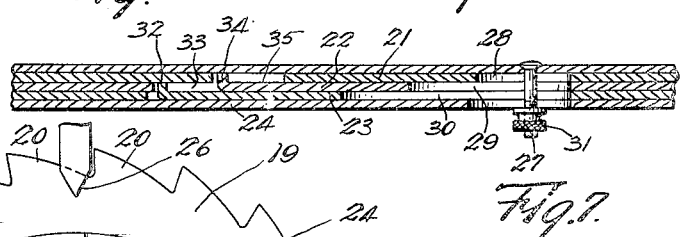
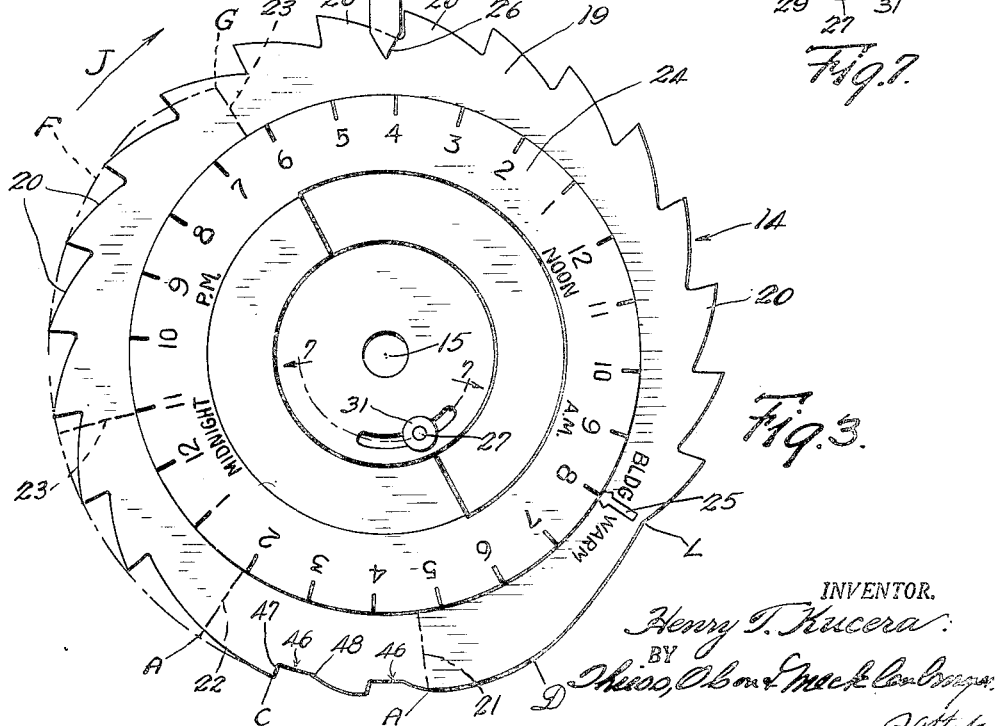
INVENTOR.
Henry T. Kucera May 16, 1950 — H. T. KUCERA — 2,508,275
TEMPERATURE CONTROLLING APPARATUS
Filed Feb. 14, 1947 — 3 Sheets-Sheet 3

INVENTOR.
Henry T. Kucera

Patented May 16, 1950

2,508,275

UNITED STATES PATENT OFFICE 2,508,275

TEMPERATURE CONTROLLING APPARATUS

Henry T. Kucera, La Grange, Ill.

Application February 14, 1947, Serial No. 728,411

14 Claims. (Cl. 200—136.3)

My invention relates to temperature controlling apparatus.

One of the objects of my invention is to provide improved apparatus for controlling the temperature of a space by chronometric means and outside temperature control means in which use is made of a rotatable timing cam having portions successively engageable with a follower to effect successive periodic heat transfer effects during a day-on period, discontinuance of heat transfer during a succeeding night-off period, and resumption of heat transfer for a substantial subsequent period prior to the resumption of the successive production of heat transfer effects.

A further object is to provide such an apparatus in which the time of change from one phase to another is controlled by outside temperature.

A further object is to provide a temperature control apparatus which will enable the prevention of relatively short heat-on periods, the effect of which (if the heating system is what is termed "sluggish") would be merely to consume fuel without producing much useful heating effect.

A further object is to provide a temperature control apparatus which can be adjusted so that it will not be effective to cause heat transfer when the outside temperature has reached a certain predetermined degree.

A further object is to provide a temperature control apparatus having a general night-off period in which provision is made for an intermittent supply of heat during a night-off period in case the outside temperature drops to a certain predetermined degree, for example, 20 degrees.

A further object is to provide a temperature control apparatus having a general day-on period in which heat is supplied periodically, the lengths of the periods being controlled by outside temperature and having a general night-off period in which, however, heat will be supplied if the outside temperature becomes extremely low, for example, 20 degrees below zero.

Further objects and advantages of the invention will be apparent from the description and claims.

In the drawings, in which an embodiment of my invention is shown:

Figure 1 is a front elevational view showing my control apparatus mounted in a casing, the cover of which is opened to expose the working apparatus;

Fig. 2 is a section on the line 2—2 of Fig. 1;

Fig. 3 is a front elevational view of the compound clock-driven cam;

Fig. 4 is a front elevational view of one of the night-off sectors of the cam;

Fig. 5 is a front elevational view of another sector;

Fig. 6 is a front elevational view of another sector;

Fig. 7 is a detail sectional view along the arcuate line 7—7 of Fig. 3;

Fig. 8 is a diagrammatic view showing the relation of certain parts of the apparatus;

Figure 9:
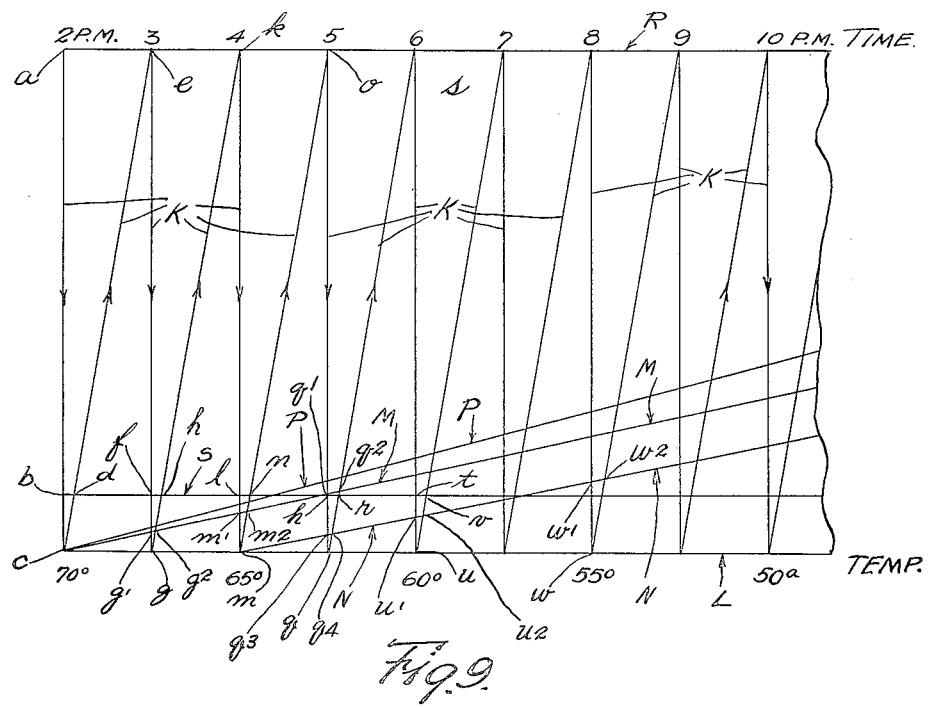
Fig. 9 is a chart showing certain time, outside temperature, and heat supply relations.

Referring to the drawings in detail, the heat control apparatus shown comprises a two-position short-motion snap switch 1 of the general type shown in my Patent No. 2,333,319, in which the switch action may be effected by an almost microscopic movement of the push button, which in one position is effective to cause a change in temperature in the space in which the temperature is to be controlled, and in its other position is ineffective to cause such change, and cooperating control means for controlling the operation of the switch. The cooperating control means comprises means controlled by temperature outside the space, the temperature of which is to be controlled for changing the position of the switch and timing cam means for controlling the position of the switch-actuating lever.

The outside temperature control means may be similar to that described in my Patent No. 2,333,319, dated November 2, 1943. It includes a closed chamber 2 exposed to outside temperature and containing a thermo-responsive liquid a metal diaphragm bellows 3 mounted in this chamber, a reciprocable plunger 4 secured to the movable head 5 of the bellows, a conoidal cam 6 secured to this plunger, and an adjustable follower 7 for controlling the position of the switch 1 and engaging the conoidal cam.

The switch 1, which may be similar to that disclosed in my above patent, is mounted on a rock arm or plate 8 rockably mounted at 9 on a post 10 extending forwardly from the base 11 of the supporting framework. With this construction the switch will be made to rise and fall in accordance with the outside temperature. The actuation of the switch 1 is controlled by a lever 12 pivotally mounted at 13 and engageable and disengageable with respect to the push button or pin 13ª of the switch 1.

The timing cam means for controlling the position of the switch actuating lever comprises a compound clock driven cam 14 mounted at 15 on a shaft driven from the clock drive mechanism 16.

The periphery of the timing cam 14 engages a follower roller 17 on the switch actuating lever 12. When the relative positions of the switch 1 and actuating lever 12 are such as to cause actuation of the switch, the push button 13ª on the switch is engaged by the flattened lower surface 16ª of the actuating lever. A coil tension spring is provided for urging the actuating lever toward the switch button.

In order to provide for the efficient operation of heating systems which are sluggish—that is to say, which do not respond promptly to the operation of the control switch—a rotatably adjustable eccentric 18 is provided for adjustably limiting the downward movement of the switch-actuating lever 12. By means of this adjustable limiting stop, the apparatus may be so set that if the actuator is allowed to engage the switch button at all, it will remain in engagement to hold the switch closed for a substantial predetermined length of time.

The compound cam comprises a generally circular disc 19 (Fig. 3), the major portion of the periphery of which is made up of a series of saw-like teeth 20 for effecting periodic shots of heat, the duration of which periods is controlled by the outside temperature, two sector-like sections 21 and 22, the arcuate edges AB of which in general may be coaxial with the tips of the teeth 20 and the arcuate edge portion CD of the disc 19 and which are mounted for angular adjustment about the axis 15 of the compound cam, an arcuate night-off section 23 having an arcuate edge portion BF having substantially the same radius as the edges AB and having a sloping or spiral edge portion FG for effecting the night shutdown, and a circular disc 24 having a twenty-four hour clock dial on its face to enable the circular disc 14 to be set to insure that the morning heat-up period DL will be started at the desired time. As the cam edge from D to L moves underneath the lever 12, the lever 12 will drop and engage the switch button 13ª to turn the heat on long enough to heat the building. The compound cam 14 is clock driven in the direction of the arrows J (Figs. 1 and 3).

The three arcuate sections 21, 22, and 23 form, in effect, an adjustable fan-like construction by means of which the beginning of the night-off period may be adjusted. The rotative movement of these sector cam sections with respect to the circular serrated cam section 19 may be limited by means of a stud 27 secured to the disc 19 and extending through registering arcuate slots 28, 29, and 30 in these sections, a nut 31 being threaded onto the stud 27 for holding the cam and dial sections in any position to which they may be set. In the embodiment shown, the arcuate slot in the sector 21 is 45 degrees in amplitude, the arcuate slot in the sector 22 is 90 degrees in amplitude, and the arcuate slot in the night-off sector 23 is 135 degrees in amplitude. The arcuate peripheral edges of the sections 21 and 22 are each substantially 45 degrees in extent. The arcuate edge of the sector 23 is somewhat more than 45 degrees in extent in order to provide the spiral edge portion EF for effecting the night-off operation of the switch-actuating lever. Thus the movement of these sectors is limited so that the arcuate sectors cannot be moved too far with respect to the circular cam element 19. In order to insure that there will be no break between the sector cam elements 21, 22 and 23 when they are being adjusted, means are provided for limiting the relative angular adjustment of these cam sections with respect to each other. These limiting means comprise a motion-limiting lug 32 on the night-off sector 23 engageable in an arcuate slot 33 in the sector 22 and a motion-limiting lug 34 on the arcuate section 22 extending into an arcuate slot 35 in the cam section 21. The angular extent of the slots 33 and 35 is substantially 45 degrees, thus limiting the relative angular movement of adjacent sectors to 45 degrees. This construction will insure that there will be no break between the sectors no matter to what position they may be adjusted.

In order to enable the temperature to be brought up to the desired daytime temperature after the night-off period, the edge of the circular cam disc 19 is provided with a sloping spiral portion DL which gradually enables the switch-actuating lever 12 to move downwardly for engagement with the push button 13ª on the switch.

In the construction shown, each saw tooth 20 has an amplitude of 15 degrees. The clock drive may be such as to rotate the compound cam once in twenty-four hours. With this construction, therefore, each saw tooth would correspond to a period of one hour. The extent of the morning warm-up edge DL of the cam 19 is substantially 30 degrees so that the morning heat-up period may be as much as two hours in length. Since the angular extent of the arcuate edge portions of the cam sections 21, 22 and 23 is substantially 45 degrees on each section, the length of the night-off period may be adjusted to change it as much as nine hours if desired. Since there are seventeen saw teeth on the circular section of the cam, the time in which periodic shots of heat may be effected may be as much as seventeen hours, depending upon the setting of the night-off sectors.

The adjustable eccentric 18 for adjustably limiting the downward movement of the switch-actuating lever 12 has a screw driver slot 26, by means of which it may be angularly adjusted to vary the distance from the axis of the eccentric to the edge portion of the eccentric which engages the actuating lever to limit its movement. An index slot 37 may be provided on the eccentric for engagement with a fixed arcuate scale 38. This construction enables the prevention of relatively short heat-on periods, the effect of which would be merely to consume fuel (if the heating system were what is termed "sluggish") without much useful heating effect.

A coil compression spring 39 is provided for urging the plunger 4 inwardly against the action of the fluid pressure in the chamber.

In order to vary the upper limit temperature at which the timing cam 14 can cause actuation of the switch 1, the position of the follower 7 with respect to the rock arm 8 on which the switch 1 is mounted is made adjustable so that the follower 7 can be adjusted so that it will not be effective to close the switch when the outside temperature reaches a certain height or degree, for example 65 degrees.

The adjustable follower 7 is pivotally mounted at 40 on a bracket secured to the rock arm 8 which carries the switch 1. The position of this follower 7 with respect to the rock arm may be adjusted by means of an eccentric 41, the circular edge of which engages the follower 7. This eccentric is provided with a screw driver slot 42 by means of which it may be rotatably adjusted. It is provided with an index slot 43 for cooperation with scale indicia 44 on the rock arm 8.

As described in my Patent No. 2,271,651, this cam 6 is so shaped that different axial sections will give different meridional contours having different degrees of angularity with respect to the axis of the cam. The axial adjustment is effected as described above by means of the expansion and contraction of the diaphragm bellows 3.

The rotational movement of the cam 6 to bring different meridional contours into cooperation with the follower 7 is effected by means of a rotatable manually operated knob 45 coaxial with the cam and secured to the plunger 4. The manual rotational adjustment of the cam enables the thermostatic control to be set for different localities or for conditions having different thermal requirements. As set forth in my prior Patent No. 2,271,651, the cam 6 comprises a conoidal portion which can be manually set for various positions of rotative adjustment and which is axially movable under the control of the temperature-controlled bellows 3. Each different manual rotational adjustment brings into cooperative relation with the cam follower a different meridional contour. These different meridional contours have different degrees of inclination with respect to the axis of the cam. If the radiation and heating equipment installed is ample so that the heating equipment does not have to operate on full time until the temperature is extremely low, the cam will be adjusted to bring a meridional contour having a relatively slight degree of inclination with respect to the axis into cooperative relation with the cam follower. On the other hand, if the radiation and heat supply apparatus is not ample, the cam can be adjusted to bring a relatively steep meridional contour into cooperative relation with the cam follower so that the heat supply will be maintained in on-condition for practically full time operation with a relatively small collapse of the thermostatic bellows 3.

In using the apparatus the nut 31 is loosened to enable relative adjustment of the sections of the compound cam 14. The index 25 is adjusted with respect to its cooperating scale to bring the index opposite the indicia on the dial at which it is desired that the building should be brought up to daytime temperature. In Fig. 3 this index is set at 8:00 A. M. The night-off controlling sectors 21, 22, and 23 are set to bring the point G of the sector 23 opposite the indicia on the dial indicating the time at which it is desired that the night shut-off should begin. In Fig. 3 this point is indicated in dotted lines in registration with the dial indicia 6:20 P. M. With this setting, and with the dial set so that the correct time of day will be indicated by the pointer 26 on the dial and with the compound cam rotating in a clockwise direction, the cam portion from D to L will enable the actuating lever 12 to drop, to effect a morning heating-up action between the hours of 6:00 A. M. and 8:00 A. M. sufficient to bring the space to be heated up to the desired daytime temperature. During the succeeding hours the saw teeth 20 periodically raise and lower the switch-actuating arm, causing periodic shots of heat, the duration of which individual shots is controlled by outside temperature until the night-off sector G to F raises the operating lever 12 to a position in which it will not engage the push button 13ᵃ of the switch. Thereafter the switch-actuating lever 12 will remain in its raised inoperative position as the compound cam rotates until the point D on the cam is in engagement with the actuating lever. At this point the morning heating-up period will begin again.

The conoidal cam 6, as previously indicated, may be in general similar to that disclosed in my Patent No. 2,333,319, dated November 2, 1943. With a fall in the outside temperature, the pressure on the bellows 3 will decrease and the plunger 4 will move to the left. This will cause the conoidal cam 6 to act on the follower 7 to raise the switch-carrying arm 8, thus moving the push button 13ᵃ toward the switch-actuating lever 12 and increasing the duration of the periodic shots effected by the cam teeth 20. It will also tend to increase the length of the morning heating-up period controlled by the cam edge L, D. The time-controlled movement of the lever 12 is several times greater than that necessary to effect the snap action of the switch 1, whereby relatively slight change in the temperature-controlled position of the switch will materially change the duration of the closed period of the switch. If desired, a remote type of bulb and bellows temperature system may be used instead of the integral type illustrated.

By changing the range of the compound temperature cam, any and all of the controls described above may be adapted to control the cooling or air conditioning of a space according to temperatures external of the space.

In the average residential or commercial building, it is practical to stop further heating when the outside temperature rises above 65° F. The loss of heat from the building at this temperature is so small that the stored-up heat in the building will keep it comfortable until the outdoor temperature drops and heating starts again. For the hospital building or other buildings which may need some heating at outdoor temperatures above 65° F., the 65 degree cutoff dial may be adjusted to provide heating at 68 or even 70 degrees outside temperature. This same dial may be adjusted downward to 35 or 60 degrees to produce reduced temperatures in a garage or warehouse.

Whenever outdoor temperatures rise to a point where heating no longer is needed (normally 65° F.), the 65 degree cutoff stops all heating. For example, on a mild spring or fall day, heating may be started in a residential-type building at 6:00 A. M. and continue until 7:00 A. M. for the morning warm-up period. Daytime operation may start at 7:45 A. M., with the first period continuing until 8:00 A. M.; then starting again at 8:48 A. M. and shutting down at 9:00 A. M. By the time the next operating period is to start (about 9:50 A. M.), the outdoor temperature may have risen to over 65° F., so the heating system would not be operated.

At such high outdoor temperatures there is practically no heat lost from the building, and any more heating would only cause building occupants to open their windows. With outdoor temperatures remaining above 65 degrees until the latter part of the afternoon, heating may not start until about 4:45 P. M. Then regular periods of heating begin again, lengthening as the outside temperature drops, and continuing until the time of night shutdown.

In the evening the controller will shut down heating earlier on a milder day—later on a colder day. In this way, an hour or more of heating can be saved on most mild days, for the stored-up heat in the building will keep the building comfortable long after the heating plant is shut down. The milder the weather, the longer is this "lag," and consequently the earlier heating can be stopped. Under ordinary weather conditions, using this controller, no heating at all is necessary during the night because the colder it is outdoors, the longer heating is continued at night and the earlier it automatically starts again in the morning. Under ordinary conditions, the stored-up heat in the building keeps the temperature from dropping excessively between the time heat is shut down for the night and the time it starts in the morning. Should the outdoor temperature drop to an extremely low subzero temperature at night, however, which might cause inside temperatures to drop excessively, the controller will turn on the heating system, regardless of the hour, and will keep it on as long as the extreme condition exists. This minimizes any excessive temperature drop in the building at night.

The controller is designed to control the temperature of any kind of building. It may be used for direct control of the stoker, gas burner, oil burner, draft blower or boiler dampers. Motor valves or zone valves, the circulating pump or a by-pass or shut-off valve of a hot water heating system or the blower of a forced air heating system are well controlled by this apparatus.

If desired, and as shown in Fig. 1, the teeth 20 may be continued all the way around the disc 19 and the cam sectors 21, 22 and 23 may be removed. This enables 24-hour controlled heat without night shut-down and morning build-up, which is desirable in some situations.

In installations where some operation is desired during the night during normally "off" hours in extremely cold temperatures only, a number of indentations 46 may be formed in the periphery of the segment c—d of the dial 14. The depth of these indentations will determine the temperature below which operation will be produced. In other words, if the depth of this indentation is made only one-half of the depth of a tooth 20, then operation will be produced only when outdoor temperatures are in the lower half of the range through which the regulator is adjusted to function. The length of the lower circular arc from 47 to 48 of the indentations will determine the length of these night operation periods.

The chart shown in Fig. 9 illustrates the effect of adjustments of the eccentric 18 by which the actuator 12 may be controlled so that if it engages the switch button 13ᵃ at all, it will remain in engagement to hold the switch closed for a substantial predetermined length of time, also the effect of adjustment of the eccentric 41 by means of which the follower 7 can be adjusted so that it will not be effective to close the switch and cause heat supply when the outside temperature reaches a predetermined degree; for example, 65 degrees.

For the sake of simplicity in plotting this chart, it is assumed that in the time period from 2:00 P. M. to 10:00 P. M., the temperature drops at a uniform rate from 70 degrees to 50 degrees. Time and temperature are indicated on the upper and lower horizontal scales, respectively.

The line L shows the lowest position to which the push button 13ᵃ is enabled to drop when the outside temperature is 70 degrees or higher and when the eccentric 41 is set to enable the maximum drop of the push botton. This line L also shows the lowest position to which the button pusher of the actuator 12 is enabled to drop when the roller 17 is in engagement with the lowest portion of a tooth 20 of the cam 14. The line R shows the highest position to which the pusher of the actuator 12 is raised when the roller 17 is in engagement with the highest portion of a tooth 20. The vertical distance from line L to line R represents the complete movement of the button pusher portion of the actuator 12 from a position in which the follower 17 engages the lowest portion of a saw-like tooth 20 to a position in which it engages the highest portion of the tooth. The zigzag line K is a graph showing the cam controlled displacement of the button engaging and pushing portion of the actuator 12 plotted against the horizontal time and temperature scales.

The graph M shows the temperature-controlled displacement of the switch push button, with continuous heat at about zero degrees outside temperature and with heat cut-off at an outside temperature of about 70 degrees, plotted against time and temperature. Graph N shows the temperature-controlled displacement of the push button of the switch with continuous heat at about −10 degrees and with heat cut-off at an outside temperature of about 65 degrees plotted against time and temperature. Graph P shows the temperature-controlled position of the switch push button with continuous heat at about 10 degrees and with heat cut-off at an outside temperature of about 70 degrees plotted against time and temperature.

The line S indicates the effect of adjustment of the eccentric 18 on the movement of the button actuator 12. It is assumed that the eccentric 18 is set so that the button pusher cannot drop below this line. This line S truncates the lower portion of the zigzag K. It indicates the lowest position to which the button pusher portion of the actuator 12 is enabled to drop when the eccentric 18 is so set that if the actuator 12 is enabled to engage the switch button 13ᵃ at all it will remain in engagement with the switch button for a period of seven minutes.

With the eccentric cam in this position the displacement versus the time graph of the button pusher is indicated by $a$, $b$, $d$, $e$, $f$, $h$, $k$, $l$, $n$, $o$, etc., as distinguished from its displacement versus time graph if the eccentric 18 were set to enable the button pusher to drop clear down to the line L, which graph would be indicated by the line $a$, $b$, $c$, $d$, $e$, $f$, $g$, $h$, $k$, $l$, $m$, etc. The elapsed time between $b$ and $d$ and between $f$ and $h$, etc., is seven minutes. When the time, temperature, and apparatus adjustments are such that the push button displacement graph periodically intersects the button pusher displacement graph, the switch will be periodically opened and closed by the engagement and disengagement of the pusher and button and periodic heat shots will result. If the two graphs do not intersect, there will be no heat shots.

Consider first a condition represented by the push button displacement graph M and the button pusher displacement graph $a$, $b$, $c$, $d$, $e$, $f$, $g$, $h$, etc. This shows that at 70 degrees outside temperature and at 2:00 p. m. the pusher and button will be just barely in contact for an instant and no heat will be delivered; that following 3:00 p. m., at which time the temperature has dropped to 67.5 degrees, the push button and button pusher will be in engagement from $g^1$ to $g^2$, corresponding to an elapsed time of about two and one-half minutes, during which period heat will be supplied; that following 4:00 p. m. at which time the outside temperature has dropped to 65 degrees, the button and pusher will be in engagement from $m^1$ to $m^2$ corresponding to an elapsed time of about five minutes, during which period heat will be supplied. A similar comment is applicable to that portion of the graph immediately following 5:00 p. m., 6:00 p. m., etc.

Consider next a second condition in which the push button displacement graph M and the button pusher displacement graph $a, b, d, e, f, h, k$, etc. are illustrative. With this setting of the eccentric 18 there will be no contact between the button pusher and the push button, either at 2:00 p. m. or 4:00 p. m. There will be no intersection of the pusher and button graphs until 5:00 p. m., at which time the temperature has fallen to 62.5 degrees. Following this engagement at 5:00 p. m. the pusher and button will remain in contact between the points $q^1$ and $q^2$ corresponding to elapsed time of a little more than seven minutes. A somewhat longer period of heat supply will begin at 6:00 p. m., at 7:00 p. m., etc. This setting of the eccentric cam 18 might be used in a heating system in which short shots of heat are comparatively ineffective and it is desired to eliminate these short shots.

It will be noted that this setting of the eccentric cam 18, while it has resulted in the elimination of the short shots of heat, has also resulted in an outside temperature cut-off of heat supply at any outside temperature higher than 62.5 degrees instead of a cut-off at any outside temperature higher than 70 degrees if the cam 18 had been set to enable the button pusher to drop clear down to the line L as in the first condition considered. This outside temperature cut-off at 62.5 degrees may, however, not be objectionable and may be desirable.

Consider now a third condition represented by the button pusher displacement versus time graph $a, b, c, d, e, f, g, h$, etc., and the push button displacement graph N in which the heat is cut off at any outside temperature above 65 degrees. Under these conditions the graph N intersects the graph $a, b, c, d, e, f, g, h$, etc. at $m$. The pusher and button will engage only momentarily at $m$ at 4:00 p. m., at which time the outside temperature is 65 degrees. No heat will be supplied above an outside temperature of 65 degrees and, as a matter of fact, no heat will be supplied until 5:00 p. m., at which time the outside temperature has fallen to 62.5 degrees. At 5:00 p. m. the pusher engages the button at $q^3$ and they remain in engagement between the points $q^3$ and $q^4$ corresponding to an elapsed time of about two and one-half minutes, during which period heat is supplied. At 6:00 p. m. another heat period begins, commencing at $u^1$ and continues to $u^2$ corresponding to a heating period of about five minutes. This third condition cuts off the supply of heat at outside temperatures above 65 degrees but does not eliminate the short shots of heat.

Consider a fourth condition in which the eccentric cam 18 is set to eliminate short shots of heat below seven minutes in length and the eccentric cam 41 is set to insure no supply of heat at outside temperatures above 65 degrees, as exemplified by the pusher versus time graph $a, b, d, e, f, h, k$, etc. and the button versus time graph N. Under these conditions the push button time graph N does not intersect the pusher time graph $a, b, d, e$, etc., until 8:00 p. m., at which time the outside temperature has fallen to 55 degrees as indicated by the intersection of the graphs at $w^1$. At this point heat will be supplied and will continue to be supplied between $w^1$ and $w^2$, for a period of about nine minutes. With this setting it will be seen that the short shots of heat will be eliminated but that no heat will be supplied until the outside temperature has fallen to 55 degrees. This condition may not be desirable. These graphs show that the adjustment of the eccentric 18 for minimum length heat shots has an effect on the adjustment of the eccentric 41 for heat cut-off by high outside temperature and that adjustment of the eccentric 18 may necessitate a corresponding readjustment of eccentric 41. A probably satisfactory readjustment of eccentric 41 would be to reset it so that the push button graph will be M rather than N, such a condition being represented in the graph corresponding to condition No. 2.

The push button versus time graph P is made mainly to show the effect of the adjustment of the cam 6 and to make clear the difference in effect on the push button temperature graph between the effect caused by adjustment of the cam 6 and the effect caused by adjustment of the eccentric cam 41. Adjustment of the cam 6 causes a change in the angle of inclination of the push button temperature graph, whereas adjustment of the cam 41 causes a shift of this graph without changing the angle of inclination. Adjustment of the cam 6 does not change the point of high temperature cut-off of heat supply whereas adjustment of the eccentric 41 does change the point of high outside temperature cutoff.

Figure 10:
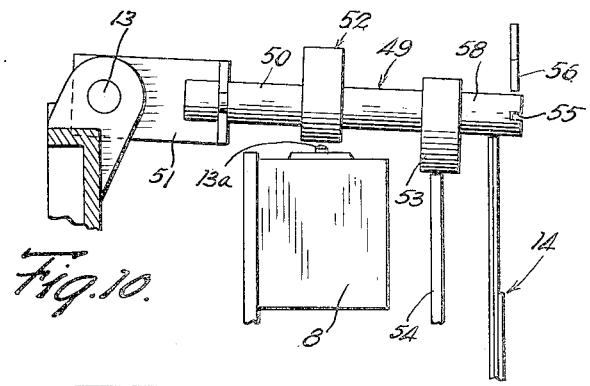
Fig. 10 is a side elevational view showing a different form of certain parts of the apparatus.
Figure 11:
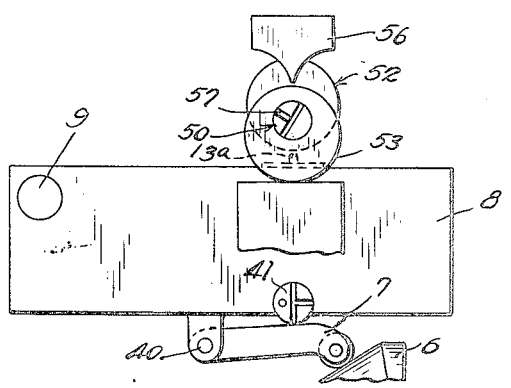
Fig. 11 is a front view of the construction shown in Fig. 10.

In order to provide for the desired cooperation between the control of the movement of the actuator 12 and the push button 13a under certain conditions, the construction shown in Figs. 10 and 11 may be substituted for the eccentrics 18 and 41. In this construction the actuator comprises a rock lever 49 which may be substituted for the actuator 12. This actuator is pivotally mounted at 13. It comprises a pin or shaft 50 rotatably adjustable in the rock piece 51 having an eccentric follower 52 engageable with the push button 13a and another eccentric follower 53 engageable with a fixed abutment 54. It is provided with a follower roller for engagement with the cam 14. The end of the swiveled pin is provided with a screw driver slot 55 to enable it to be set in any desired position of rotative adjustment. If desired, a suitable index 56 may be provided for cooperation with a suitable indicator such as the slot 57 on the rotatable shaft 50 to indicate the direction in which the shaft 50 should be turned to change the degree of outside temperature at which heat will be cut off and also the length of the shortest possible heat-on period. The cylindrical follower portion 58 cooperates with the cam 14 in the same manner as the follower 17. By suitably positioning the cams 52 and 53 any desired type of cooperation between the upper temperature limit for heat supply and the minimum duration of heat shots may be obtained.

Further modifications will be apparent to those skilled in the art and it is desired, therefore, that the invention be limited only by the scope of the appended claims.

Having thus described my invention, what I claim and desire to secure by Letters Patent is:

1. Heat transfer control apparatus comprising two members mounted for relative movement from one position to another into and out of engagement with each other which in one position cause the transfer of heat with respect to a space and in another do not cause heat transfer, rotatable timing-cam means for effecting periodic oscillation of a first one of said members to move it toward and from the other, means controlled by temperature outside said space for effecting movement of the other of said members toward and from the first, the oscillation of said first member in at least one direction being gradual so that the duration of engagement between the members for each oscillation will vary with the variation in position of the temperature-controlled member, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element, thus insuring that if the temperature-controlled control element is caused by temperature control to be brought into engagement with the other element the duration of this engagement will be at least as long as is such proportional period.

2. Heat transfer control apparatus comprising two members mounted for relative movement from one position to another into and out of engagement with each other which in one position cause the transfer of heat with respect to a space and in another do not cause heat transfer, rotatable timing-cam means for effecting periodic oscillation of a first one of said members to move it toward and from the other, cam means controlled by temperature outside said space for effecting movement of the other of said members toward and from the first, the oscillation of said first member in at least one direction being gradual so that the duration of engagement between the members for each oscillation will vary with the variation in position of the temperature-controlled member, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element, thus insuring that if the temperature-controlled control element is caused by temperature control to be brought into engagement with the other element the duration of this engagement will be at least as long as is such proportional period.

3. A temperature control apparataus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element, thus insuring that if the temperature-controlled control element is caused by temperature control to be brought into engagement with the other element the duration of this engagement will be at least as long as is such proportional period.

4. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element comprising adjustable stop means for stopping the fall movement of the follower before it reaches the limit of the common range, thus insuring that if the temperature-controlled control element is caused by temperature control to be brought into engagement with the other element the duration of this engagement will be at least as long as is such proportional period.

5. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element comprising a dwell portion between said rise portion and fall portion, thus insuring that if the temperature-controlled control element is caused by temperature control to be brought into engagement with the other element the duration of this engagement will be at least as long as is such proportional period.

6. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said temperature-controlled means comprising a cam movable back and forth by changes in temperature and transmission between said cam and the element controlled thereby comprising a rock member movable back and forth by said cam, a follower rockably mounted on said rock member and means for adjusting the position of said rockable follower on said rock member to vary the upper temperature limit at which said control elements may be caused to engage by said cam-controlled means.

7. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled rotatable cam having a gradual cam rise portion from low to high and a fall portion from high to low, a follower biased toward said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element, thus insuring that if the temperature-controlled control element is caused by temperature control to be brought into engagement with the other element the duration of this engagement will be at least as long as is such proportional period, said control elements including a snap-switch having a short-motion movable contact member movable with a snap action past a dead center to change the condition of heat transfer apparatus and an actuator therefor, the time-controlled movement being several times greater than that necessary to effect the snap action of the switch, whereby a relatively slight change in the temperature-controlled relative position will materially change the duration of the closed period of the switch.

8. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled rotatable cam having a gradual cam rise portion from low to high and a fall portion from high to low, a follower biased towards said cam and successively juxtaposed to said rise and fall portions as the cam rotates for controlling the movement of one of said elements toward and from engagement with the other, means whereby as said follower is juxtaposed to one of said cam portions said elements will be urged to approach each other and whereby as it is juxtaposed with respect to the other of said portions said elements will be urged to recede from each other, and means whereby the time of maintained engagement and disengagement of said elements is determined by the height of the point of engagement between said follower and cam rise at the instant of such engagement and disengagement, said two control elements having at least in part a common range of movement whereby initial engagement and disengagement of said elements may take place at any point in this common range, said time-controlled means having provisions for preventing said follower from dropping below a certain height for a substantial proportion of the period between successive rises to terminate the range of movement of the corresponding control element short of the termination of the range of movement of the other control element, thus insuring that if the temperature-controlled control element is caused by temperature control to be brought into engagement with the other element the duration of this engagement will be at least as long as is such proportional period, said time-and temperature-controlled means comprising a snap-switch having a short-motion movable contact member movable with a snap action past a dead center to change the condition of heat transfer apparatus and an actuator therefor, a rock arm on which said switch is mounted, a rock lever for actuating said switch, means for periodically rocking said rock lever to effect periodic opening and closing of the switch, and apparatus controlled by temperature outside the temperature-controlled space for changing the position of said rock arm and switch in accordance with said outside temperature.

9. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said temperature-controlled means comprising a cam movable back and forth by changes in temperature and transmission between said cam and the element controlled thereby comprising a rock member movable back and forth by said cam, a follower rockably mounted on said rock member and means for adjusting the position of said rockable follower on said rock member to vary the upper temperature limit at which said control elements may be caused to engage by said cam-controlled means, said control elements including a snap-switch having a short-motion movable contact member movable with a snap action past a dead center to change the condition of heat transfer apparatus, and an actuator therefor, the time-controlled movement being several times greater than that necessary to effect the snap action of the switch, whereby a relatively slight change in the temperature-controlled relative position will materially change the duration of the closed period of the switch.

10. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said temperature-controlled means comprising a cam movable back and forth by changes in temperature and transmission between said cam and the element controlled thereby comprising a rock member movable back and forth by said cam, a follower rockably mounted on said rock member and means for adjusting the position of said rockable follower on said rock member to vary the upper temperature limit at which said control elements may be caused to engage by said cam-controlled means, said time- and temperature-controlled means comprising a snap-switch having a short-motion movable contact member movable with a snap action past a dead center to change the condition of heat transfer apparatus and an actuator therefor, a rock arm on which said switch is mounted, a rock lever for actuating said switch, means for periodically rocking said rock lever to effect periodic opening and closing of the switch, and apparatus controlled by temperature outside the temperature-controlled space for changing the position of said rock arm and switch in accordance with said outside temperature.

11. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled generally circular rotary cam having a plurality of arcuately-spaced variable radius alternating rise and fall portions, and a follower engageable therewith as the cam rotates for effecting back-and-forth movement of one of said control elements, said cam being provided with a blocking element secured to rotate therewith angularly adjustable about the axis of said cam and having an arcuate periphery engageable with said follower as the cam rotates having a radius long enough to keep the follower from engaging the fall portion of the cam adjacent the blocking element.

12. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, said time-controlled means comprising a time-controlled generally circular rotary cam having a plurality of arcuately-spaced variable radius alternating rise and fall portions, and a follower engageable therewith as the cam rotates for effecting back-and-forth movement of one of said control elements, said cam being provided with a plurality of blocking elements secured to rotate therewith, each being angularly adjustable about the axis of said cam and having an arcuate periphery engageable with said follower as the cam rotates having a radius long enough to keep the follower from engaging the fall portion of the cam adjacent the blocking element, said blocking elements being angularly adjustable from superposed to extended position.

13. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, one of said control elements comprising a rock arm, said time-controlled means comprising a time-controlled cam rotatable about a horizontal axis having a peripheral rise and fall portion and lying in a plane substantially parallel to the plane of movement of said rock arm, a follower engaging said cam periphery and a second rock arm on which said follower is mounted extending between said planes.

14. A temperature control apparatus comprising two control elements which when brought into and held in engagement, or brought out of and held out of engagement, effect and maintain a change in the condition of heat transfer apparatus, and means controlled by time and temperature for controlling the length of periods of engagement and disengagement of said elements, said temperature-controlled means comprising means whereby a change of temperature in one direction tends to effect engaging movement of one of said elements and a change in the other direction tends to effect disengaging movement, one of said control elements comprising a rock arm, said time-controlled means comprising a time-controlled cam rotatable about a horizontal axis having a peripheral rise and fall portion and lying in a plane substantially parallel to the plane of movement of said rock arm, a follower engaging said cam periphery, and a second rock arm on which said follower is mounted extending between said planes and having its pivoted end outside of the space between said planes.

HENRY T. KUCERA.

REFERENCES CITED

The following references are of record in the file of this patent:

UNITED STATES PATENTS

| Number | Name | Date |
|---|---|---|
| 2,333,319 | Kucera | Nov. 2, 1943 |
| 2,359,596 | Walsh | Oct. 3, 1944 |

Certificate of Correction

Patent No. 2,508,275　　　　　　　　　　　　　　　　　　　　　May 16, 1950

HENRY T. KUCERA

It is hereby certified that error appears in the printed specification of the above numbered patent requiring correction as follows:

Column 3, line 42, for "edge portion BF" read *edge portion EF*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*